(12) United States Patent
Bray et al.

(10) Patent No.: US 10,434,814 B2
(45) Date of Patent: Oct. 8, 2019

(54) SECURITY DOCUMENT HAVING ENHANCED FOIL DURABILITY

(71) Applicant: Neenah Paper, Inc., Alpharetta, GA (US)

(72) Inventors: David Bray, Bolton (GB); Jonathan Robson, Bolton (GB); Vivian Taylor, Bolton (GB); Jamie Flannigan, Bolton (GB); Ann-Marie Busch, Bolton (GB)

(73) Assignee: Neenah, Inc., Alpharetta, GA (US)

( * ) Notice: Subject to any disclaimer, the term of this patent is extended or adjusted under 35 U.S.C. 154(b) by 0 days.

(21) Appl. No.: 15/592,298

(22) Filed: May 11, 2017

(65) Prior Publication Data

US 2017/0326902 A1    Nov. 16, 2017

Related U.S. Application Data

(60) Provisional application No. 62/334,813, filed on May 11, 2016.

(51) Int. Cl.
*B23K 26/38* (2014.01)
*B42D 15/00* (2006.01)
(Continued)

(52) U.S. Cl.
CPC .............. *B42D 25/36* (2014.10); *B32B 7/12* (2013.01); *B32B 15/20* (2013.01); *B32B 37/12* (2013.01); *B32B 38/06* (2013.01); *B42D 13/00* (2013.01); *B42D 25/24* (2014.10); *B42D 25/29* (2014.10); *B42D 25/324* (2014.10); *B42D 25/373* (2014.10); *B42D 25/378* (2014.10); *B42D 25/425* (2014.10); *B42D 25/455* (2014.10); *B42D 25/46* (2014.10); *B42D 25/47* (2014.10);
(Continued)

(58) Field of Classification Search
CPC .... B42D 25/29; B42D 25/00; B42D 2035/20; B42D 25/23; B42D 25/30; B42D 25/373; B42D 25/351; B42D 25/328
See application file for complete search history.

(56) References Cited

U.S. PATENT DOCUMENTS

| 4,477,312 A | 10/1984 | Czichy | |
|---|---|---|---|
| 5,492,370 A * | 2/1996 | Chatwin | .................. B41M 3/14 283/107 |

(Continued)

FOREIGN PATENT DOCUMENTS

| EP | 2639075 A1 | 9/2013 |
|---|---|---|
| EP | 2660067 A1 | 11/2013 |

(Continued)

OTHER PUBLICATIONS

International Search Report, dated Aug. 27, 2017.

*Primary Examiner* — Shin H Kim
(74) *Attorney, Agent, or Firm* — Meunier Carlin & Curfman LLC

(57) ABSTRACT

A security document, along with its methods of formation, is provided. The security document may include a base sheet, a colored coating on the base sheet, a foil laminate on at least a portion of the colored coating, and an outer lacquer coating over the colored coating such that the foil laminate is embedded between the colored coating and the outer lacquer coating. The outer lacquer coating may include a polymeric resin, and may also include a crosslinking agent and a wetting agent.

18 Claims, 2 Drawing Sheets

(51) Int. Cl.

| | | |
|---|---|---|
| *B42D 25/36* | (2014.01) | |
| *B42D 25/24* | (2014.01) | |
| *B42D 25/373* | (2014.01) | |
| *B42D 25/378* | (2014.01) | |
| *B42D 25/425* | (2014.01) | |
| *B42D 25/47* | (2014.01) | |
| *B32B 7/12* | (2006.01) | |
| *B32B 15/20* | (2006.01) | |
| *B32B 37/12* | (2006.01) | |
| *B32B 38/06* | (2006.01) | |
| *B42D 13/00* | (2006.01) | |
| *D21H 19/66* | (2006.01) | |
| *D21H 19/80* | (2006.01) | |
| *D21H 21/14* | (2006.01) | |
| *D21H 21/40* | (2006.01) | |
| *B42D 25/29* | (2014.01) | |
| *B42D 25/455* | (2014.01) | |
| *B42D 25/324* | (2014.01) | |
| *B42D 25/46* | (2014.01) | |

(52) U.S. Cl.
CPC ............ *D21H 19/66* (2013.01); *D21H 19/80* (2013.01); *D21H 21/14* (2013.01); *D21H 21/40* (2013.01); *B32B 2309/105* (2013.01); *B32B 2425/00* (2013.01)

(56) References Cited

U.S. PATENT DOCUMENTS

| | | | |
|---|---|---|---|
| 5,501,902 A | 3/1996 | Kronzer | |
| 5,781,316 A | 7/1998 | Strahl et al. | |
| 5,827,603 A | 10/1998 | Suss | |
| 6,061,122 A * | 5/2000 | Hoshino | G03H 1/02 250/556 |
| 6,138,913 A * | 10/2000 | Cyr | G06K 19/14 235/468 |
| 6,294,241 B1 | 9/2001 | Kaule et al. | |
| 7,818,782 B2 * | 10/2010 | Saito | G02B 5/3016 380/54 |
| 8,435,725 B2 | 5/2013 | Geuens | |
| 2003/0234286 A1 * | 12/2003 | Labrec | B41M 3/14 235/380 |
| 2004/0101676 A1 * | 5/2004 | Phillips | B32B 27/36 428/323 |
| 2005/0142342 A1 | 6/2005 | Lutz et al. | |
| 2006/0014099 A1 * | 1/2006 | Faler | C08G 18/672 430/270.1 |
| 2006/0275625 A1 * | 12/2006 | Lieberman | B41F 5/22 428/697 |
| 2007/0098959 A1 * | 5/2007 | Lieberman | B41F 5/22 428/172 |
| 2007/0206249 A1 * | 9/2007 | Phillips | C09J 11/02 359/2 |
| 2008/0128493 A1 * | 6/2008 | Jones | B41M 5/24 235/380 |
| 2008/0232221 A1 * | 9/2008 | Holmes | B42D 25/29 369/94 |
| 2008/0282322 A1 * | 11/2008 | Saito | G02B 5/3016 726/2 |
| 2010/0182211 A1 * | 7/2010 | Peters | G06K 19/06009 343/730 |
| 2010/0209697 A1 * | 8/2010 | Bowles | C08G 18/3275 428/323 |
| 2010/0221661 A1 * | 9/2010 | Bowles | C08F 290/067 430/280.1 |
| 2011/0115212 A1 * | 5/2011 | Hoffmuller | B42D 25/43 283/85 |
| 2011/0234953 A1 * | 9/2011 | Amimori | G02B 5/3083 349/119 |
| 2011/0239886 A1 * | 10/2011 | Holmes | B42D 25/405 101/483 |
| 2012/0127546 A1 * | 5/2012 | Sugiura | G03H 1/0011 359/1 |
| 2013/0063826 A1 * | 3/2013 | Hoffmuller | B44C 1/1737 359/619 |
| 2014/0077485 A1 * | 3/2014 | Raksha | B41M 7/0072 283/67 |
| 2014/0131990 A1 * | 5/2014 | Zolotukhin | B41M 5/24 283/86 |
| 2015/0125670 A1 * | 5/2015 | Szumski | G06K 19/07735 428/201 |
| 2015/0352887 A1 * | 12/2015 | Holmes | B42D 25/29 283/91 |
| 2016/0271996 A1 * | 9/2016 | Sautter | B32B 5/12 |
| 2017/0057275 A1 * | 3/2017 | Cote | B44C 1/1716 |
| 2017/0326902 A1 * | 11/2017 | Bray | B42D 25/36 |
| 2018/0024377 A1 * | 1/2018 | Kumar | G02C 7/021 |

FOREIGN PATENT DOCUMENTS

| | | |
|---|---|---|
| EP | 2848423 | 3/2015 |
| EP | 2857218 A2 | 4/2015 |
| WO | WO 2010/106377 | 9/2010 |
| WO | 2013010673 A1 | 1/2013 |

\* cited by examiner

SECURITY DOCUMENT HAVING ENHANCED FOIL DURABILITY

PRIORITY INFORMATION

The present application claims priority to U.S. Provisional Patent Application Ser. No. 62/334,813 titled "Security Document Having Enhanced Foil Durability" filed on May 11, 2016, the disclosure of which is incorporated by reference herein.

BACKGROUND

Metallic holographic laminates and foils are often used as security components for security documents, such as passports, identity cards, credential items (such as credit cards and bank cards), and other government documents. Typically, these laminates and foils are used in such documents to provide an indication of the authenticity of the item, overt and sometimes also covert. For example, these foils can be used by a government agency to authenticate a government document (e.g., a passport). Foils and laminates are usually produced in a reel to reel process on a polyester (PET), or other polymer, base film.

The resulting security document is exposed to different environments and conditions, particularly when used as a passport, which can erode the laminate causing the foil to delaminate. Previous attempts to improve durability of the foil laminate have focused on improving the foil material, but have been unsuccessful to meet the demands of the industry. As such, improving the durability of security laminate/foil is still needed, along with an improved production method for producing the same.

SUMMARY

Objects and advantages of the invention will be set forth in part in the following description, or may be obvious from the description, or may be learned through practice of the invention.

A security document is generally provided, along with its methods of formation. In one embodiment, the security document includes a base sheet, a colored coating on the base sheet, a foil laminate on at least a portion of the colored coating, and an outer lacquer coating over the colored coating such that the foil laminate is embedded between the colored coating and the outer lacquer coating. Generally, the outer lacquer coating comprises a polymeric resin, and may also include a crosslinking agent and a wetting agent.

Methods are also provided for forming such a security document. In one embodiment, the method includes forming an outer lacquer coating over a foil laminate adhered to a colored coating of a base sheet such that the foil laminate is embedded between the colored coating and the outer lacquer coating. In another method, the foil laminate may be embedded between a base sheet and an outer lacquer coating, with the base sheet including a colored coating on which the foil laminate is adhered and the outer lacquer coating being applied over the foil laminate and the colored coating.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
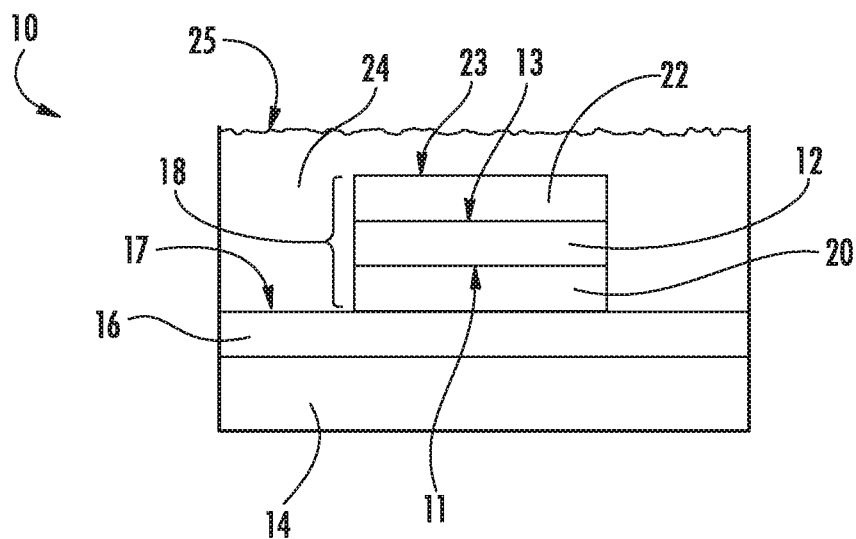
FIG. 1 shows a cross-sectional schematic view of an exemplary embodiment of a security document.

Repeat use of reference characters in the present specification and drawings is intended to represent the same or analogous features or elements of the present invention.

DEFINITIONS

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation to the viewer.

As used herein, the terms "first", "second", and "third" may be used interchangeably to distinguish one component from another and are not intended to signify location or importance of the individual components.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Security documents, such as passports and related travel documents, are generally provided that have enhanced foil durability and security properties, along with their methods of manufacture. In particular, the security documents include a foil embedded within a multilayered coating structure such that the foil is protected from external factors that could otherwise degrade the foil over time during normal use. In particular embodiments, the foil is embedded within the laminate under durable lacquer coating(s), which is applied after the foiling process. As such, the durable lacquer coating is exposed to the external factors to protect the underlying foil from external factors that would otherwise result in foil degradation.

Figure 2:
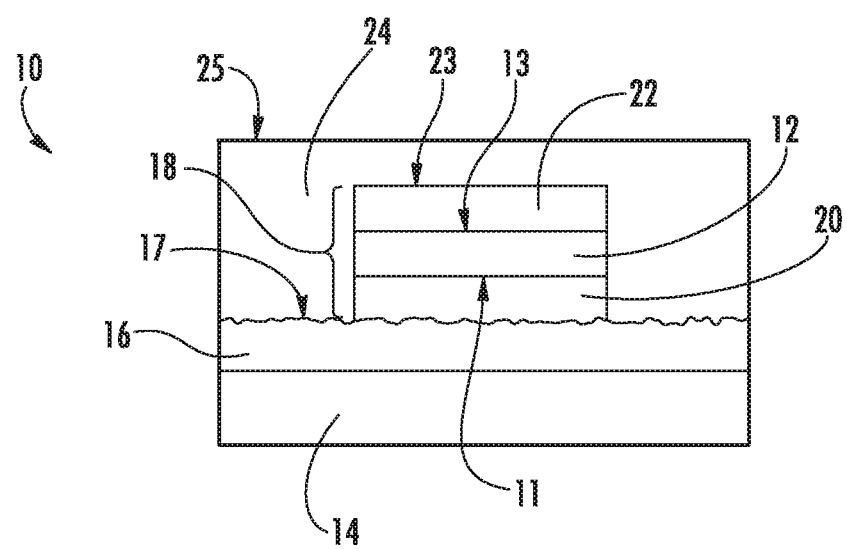
FIG. 2 shows a cross-sectional schematic view of another exemplary embodiment of a security document.

FIGS. 1 and 2 show exemplary embodiments of a security document 10 that includes an embedded foil 12. The construction of the embodiments shown in FIGS. 1 and 2 are similar, but for the location of the embossed profile as discussed below. As such, the foil 12 is embedded within a polymer-based outer lacquer coating 24, as shown in FIGS. 1 and 2, to offer significantly more protection compared to an uncoated configuration. This enhanced protection results in increased level of abrasion, chemical and environmental resistance, and protection for the underlying foil 12.

I. Base Sheet

Generally, the security document 10 includes a base sheet 14, such as a nonwoven web, a woven web, a polymeric film, or the like. In one embodiment, the base sheet 14 is a cellulosic nonwoven web (e.g., a paper web). The base sheet 14 is generally flexible. In addition to flexibility, the base sheet 14 also should have sufficient strength for handling, coating, sheeting, and/or other operations associated with the manufacture of the security document 10. In some embodiments, the base sheet 14 can be a latex-impregnated paper such as described, for example, in U.S. Pat. No. 5,798,179, the entirety of which is incorporated herein by reference. The basis weight of the base sheet 14 could be any suitable amount for the particular document 10 to be formed, but will typically vary from about 150 $g/m^2$ to about 450 $g/m^2$.

II. Color Coating

A color coating 16 is shown directly on the base sheet 14. However, in other embodiments, additional layers or coating may be positioned between the base sheet 14 and the color coating 16, such as an adhesive layer(s), a conformable layer(s), etc. The color coating 16 generally includes a colored agent (e.g., a pigment, a dye, etc.) dispersed within a polymeric matrix. The polymeric matrix can be applied in the form of a latex that includes one or more of the following: acrylics, polyvinylacetates, polystyrenes, polyvinyl alcohols, polyurethanes, polyvinychlorides, as well as many copolymer lattices such as ethylene-vinylacetate copolymers, acrylic copolymers, vinyl chloride-acrylics, vinylacetate acrylics, other hard acrylic polymers, and so forth.

The thickness of the color coating 16 may vary considerably depending upon a number of factors including, but not limited to, the type of base sheet 14 or the end use of the security document 10 to be formed. Typically, the color coating 16 has an average thickness of less than about 50 microns (μm), such as about from about 8 μm to about 30 μm (e.g., about 5 μm to about 20 μm). The thickness of the color coating 16 may also be described in terms of a basis weight. Desirably, the color coating 16 has a basis weight of less than about 45 $g/m^2$, such as about 2 $g/m^2$ to about 25 $g/m^2$.

The color coating 16 may be formed on the base sheet 14 by known coating techniques, such as by roll, blade, Meyer rod, and air-knife coating procedures. The resulting color coating 16 then may be dried by means of, for example, steam-heated drums, air impingement, radiant heating, or some combination thereof In the embodiment of FIG. 1, the surface 17 of the color coating 16 that is opposite from the base sheet 14 is substantially uniform. However, in the embodiment of FIG. 2, the surface 17 defines a continuous embossed profile on the color coating 16, a portion of which is overlaid by the foil 12. The continuous embossed profile is defined by varying thickness in the color coating 16 across the base sheet 14 so as to define a series of local peaks and valleys within the surface 17. However, the areas not covered by the foil 12 show the embossed profile on the resulting security document 10. In the embodiment of FIG. 2, the embossed profile of the surface 17 of the color coating 16 can be used to authenticate the document 10 since it provides a feature that is not easily replicated on or within the document 10. Thus, the embossed profile can, along with the foil 12, provide security features to the document 10. Additionally, the embossed profile can be protected for improved durability by the overlying outer layer 24.

III. Foil Laminate

The foil laminate 18 is applied, in one particular embodiment, as a plurality of layers. First, an adhesive layer 20 is applied to the surface 17 of the color coating 16. Second, the foil 12 (i.e., a foil layer) is positioned on the adhesive layer 20. Finally, a lacquer layer 22 is positioned on the foil 12. In the embodiment shown in FIGS. 1 and 2, the adhesive layer 20 contacts an inner surface 11 of the foil 12, and the lacquer layer 22 is directly on the outer surface 13 of the foil 12. Although shown having three layers, the foil laminate 18 can be formed from any suitable number of layers or coatings. In certain embodiments, the foil laminate 18 has a total thickness of about 5 μm to about 15 μm.

The adhesive layer 20 serves to bond the foil 12 to the color coating 16 and, ultimately, the base sheet 14. The adhesive layer 20 can be formed of any suitable material (e.g., acrylic resins, etc.).

The foil 12, in one particular embodiment, includes at least one non-transparent metal material, such as aluminum, copper, or mixtures thereof. In certain embodiments, other materials can also be present in the foil 12, such as metal oxides (e.g., titanium dioxide, zinc oxide, etc.), metal sulfides (e.g., zinc sulfide, etc.). In one particular embodiment, the foil 12 is an aluminum layer having a thickness that is about 1 µm or less (i.e., a sub-micron layer).

The lacquer layer 22 on the outer surface 13 of the foil 12 is generally configured to have a relatively high surface energy so that an additional coating can wet and adhere to its surface 23, such as a surface energy of about 40 dynes or greater (e.g., about 40 dynes to about 55 dynes). As such, the lacquer layer 22 can provide improved adhesion strength to additional layers thereon (e.g., a lacquer coating 24). Additionally, in order to increase durability, the adhesion strength of the lacquer layer 22 to the foil 12 is greater than that of the external forces that cause degradation when applied. That is, interface of the outer surface 13 of the foil 12 and the lacquer layer 22 can have a greater strength than the external force applied to resist failure of the product. Thus, the components of the lacquer layer 22 can be selected to be durable and flexible and have a high cohesive and adhesive strength. The foil 12, once coated, must also exhibit the same resistance to adhesive and cohesive failure to the lacquer coat.

The lacquer layer 22 can generally be formed of any suitable material, and is typically a polymeric material. In particular embodiments, the lacquer layer 22 is formed from a polymeric resin that includes an acrylic, an acrylate, a nitrocellulose material, or blends or copolymers of such materials. Other additives can also be included, such as wetting agents, cross linking agents (e.g., multifunctional acids, anhydrides, metal based catalysts, polyaziridine and carbonyls) to improve on the durability of the coating, waxes and stearates to improve the slip properties of the formulation, and other processing agents. In certain embodiments, the lacquer layer 22 can be tinted to alter the appearance of the foiled surface. For example, pigments or dyes can be included within the lacquer layer 22.

In one particular embodiment, the foil laminate 18 can be a XO grade foil available commercially from API Foils, Ltd. (Cheshire, United Kingdom). The foil laminate 18 may be of flexible construction, and may be of reel or sheet form.

As shown in FIGS. 1 and 2, the foil laminate 18 is applied only to a portion of the surface 17 of the colored coating 16, while leaving the colored coating 16 exposed in the other portions of the document 10. However, in other embodiments, it may be desired to apply the foil laminate 18 over the entire surface 17 of the colored coating 16.

Figure 3:
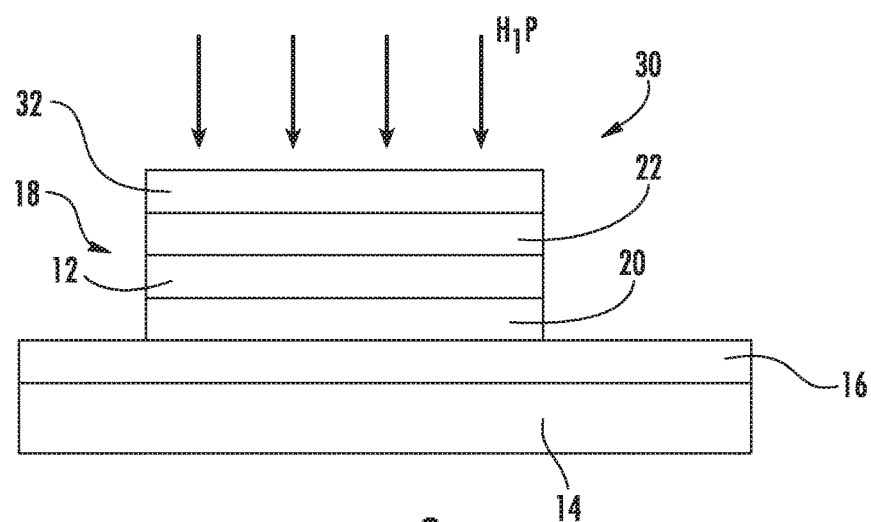
FIG. 3 shows a cross-sectional schematic view of an exemplary method of applying a foil laminate to a base sheet during the formation of an exemplary security document, such as shown in FIG. 1 or 2.

FIG. 3 shows one exemplary method of applying the foil laminate 18 onto the surface 17 of the colored coating 16 using a foil source material 30 that includes the foil laminate 18 on a release sheet 32. As shown, the foil source material 32 is positioned such that the exposed adhesive layer 20 is positioned adjacent to the colored coating 16. Heat (H) and pressure (P) are then applied onto the release sheet 32 to transfer the foil laminate 18 from the release sheet to the base sheet 14. In particular embodiments, the foil laminate 18 can be applied using a stamping machine (e.g., having a patterned die) at a temperature of about 90° C. to about 220° C. Utilizing a patterned die, a portion of the foil laminate 18 is transferred from the release sheet 32 onto the base sheet 14.

Figure 4:
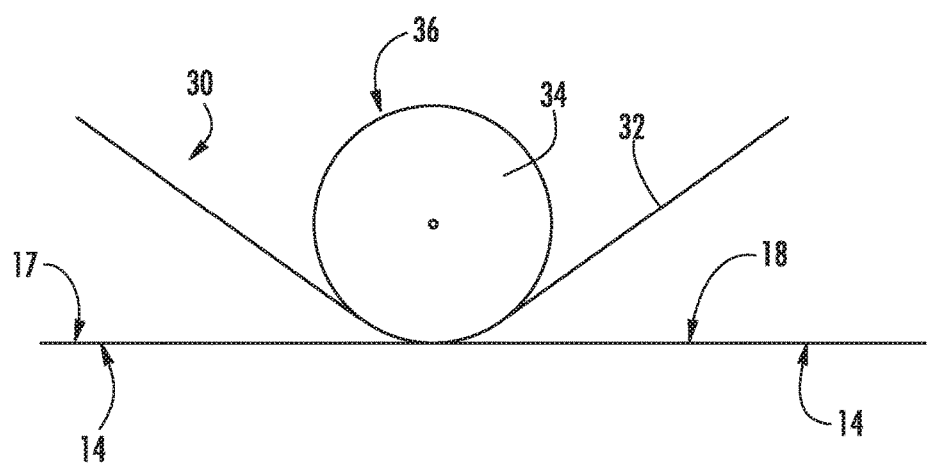
FIG. 4 shows a cross-sectional schematic view of an exemplary method of applying a foil laminate to a base sheet using a drum roll during the formation of an exemplary security document, such as shown in FIG. 1 or 2.

FIG. 4 shows an exemplary method of applying the foil laminate 18 onto the surface 17 of the colored coating 16 using a foil source material 30 passing through a drum roll 34. The roll surface 36 can define a pattern to transfer a portion of the foil laminate 18 from the foil source material 30 onto the base sheet 14. For example, the surface 36 of the drum roll 34 can have a temperature of about 90° C. to about 220° C.

IV. Lacquer Coating

As shown in FIGS. 1 and 2, an outer lacquer coating 24 is applied over the entire document 10 to cover both the foil laminate 18 and any exposed surface 17 of the color coating 16. In order to achieve the adhesion onto the foil, the outer lacquer coating 24 is generally formulated to resist abrasive, tensile, compressive, creasing, folding, chemical and environmental forces. In one embodiment, the outer lacquer coating 24 is formed form a base resin and has surface modifications that either lower the amount of force applied onto the system or increase the bond strength and wetting of the lacquer coat to exceed these external forces that result in product failure.

For example, in one embodiment, the outer lacquer coating 24 includes a polymeric resin, which may include polymeric material that includes an acrylic, acrylate, polyurethane, polysilicone, polysiloxane, a nitrocellulosic material, polytetrafluoroethylene, polyvinyl acetate, or blends or copolymers of such materials. Appropriate levels of wetting additives can be added to ensure that wetting and adhesion onto the color coating 16 and foil laminate 18 are achieved. Thus, the outer lacquer coating 24 adheres well to the underlying lacquer layer 22. Other additives can also be included. One such additive is the use of cross linking agents such as multifunctional acids, anhydrides, metal based catalysts, polyaziridine and carbonyls to improve on the durability of the coating. Other additives that can be used include waxes and stearates to improve the slip properties of the formulation.

In one embodiment, the outer lacquer coating 24 includes a water-based polyacrylic at a concentration of about 80% to about 95% by weight (e.g., for base strength, adhesion and flexibility), a water-based polysiloxane at a concentration of about 5% to about 15% by weight (e.g., to lower the surface free energy of the lacquer coat, imparting scuff resistance of the coating); a crosslinking agent (e.g., a polyaziridine) at a concentration of about 0.5% to about 5% by weight (e.g., about 1% to about 3% by weight) to crosslink the polymeric materials together; and a wetting agent at a concentration of about 0.5% to about 5% by weight (e.g., about 1% to about 3% by weight) to promote wetting of the surface and adhesion.

The outer lacquer coating 24 may contain other additives, such as processing aids, pigments, glossing or deglossing agents, antifoam agents, surfactants, pH control agents such as ammonium hydroxide, rheology control agents and the like.

In the embodiment of FIG. 1, the embossed profile is continuous over the entire sheet, increasing the level of difficulty in reproducing the feature. That is, the outer lacquer coating 24 includes an embossed profile across its entire external surface 25, although such an embossed profile may be positioned on a portion of the external surface 25. The embossed profile is generally defined by varying thickness in the outer lacquer coating 24 across the base sheet 14 so as to define a series of local peaks and valleys within the outer surface 25. In the embodiment of FIG. 1, the embossed profile of the outer surface 25 can be used to authenticate the document 10 since it provides a feature that is not easily replicated on or within the document 10. Thus, the embossed profile can, along with the foil 12, provide security features to the document 10.

The improved construction as shown in FIG. 1 offers an opportunity to introduce a uniform emboss pattern over the foiled image (i.e., over the foil laminate 18) resulting in a more difficult feature to replicate without using advanced manufacturing process routes. Additionally, since the foil is being applied to a flat surface 17, higher resolution of foil images are possible resulting in finer detail of foiling than can be currently achieved. With the application of finer detail in the foiled image greater security details can be incorporated such as reduced text size or narrower line widths.

FIG. 2 shows an alternative embodiment where the continuous embossed profile, found on the surface 17 of the color coating 16, is broken by the impression of the foil 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A security document, comprising:
a base sheet;
a colored coating on said base sheet;
a foil laminate on at least a portion of the colored coating, wherein the foil laminate comprises an adhesive layer, a foil sheet, and a lacquer layer, and wherein the adhesive layer is positioned on the colored coating, and wherein the foil sheet is positioned between the adhesive layer and the lacquer layer; and
an outer lacquer coating over the colored coating such that the foil laminate is embedded between the colored coating and the outer lacquer coating, wherein the outer lacquer coating comprises a polymeric resin.

2. The security document of claim 1, wherein the polymeric resin includes an acrylic, acrylate, polyurethane, polysilicone, polysiloxane, a nitrocellulosic material, polytetrafluoroethylene, polyvinyl acetate, or copolymers thereof, or blends thereof.

3. The security document of claim 1, wherein the polymeric resin of the outer lacquer coating comprises a water-based polyacrylic and a water-based polysiloxane, and wherein the outer lacquer coating further comprises a crosslinking agent and a wetting agent.

4. The security document of claim 3, wherein the water-based polyacrylic is included in the outer lacquer coating at a concentration of about 80% to about 95% by weight, wherein the water-based polysiloxane is included in the outer lacquer coating at a concentration of about 5% to about 15% by weight, and wherein the crosslinking agent is included in the outer lacquer coating at a concentration of about 0.5% to about 5% by weight, and further wherein the wetting agent is included in the outer lacquer coating at a concentration of about 0.5% to about 5% by weight.

5. The security document of claim 3, wherein the crosslinking agent comprises polyaziridine.

6. The security document of claim 1, wherein the outer lacquer coating comprises an outer surface having an embossed profile.

7. The security document of claim 1, wherein the outer lacquer coating covers the entire colored coating.

8. The security document of claim 1, wherein the foil laminate covers only a portion of the colored coating.

9. The security document of claim 1, wherein the colored coating comprises a surface on which the foil laminate is positioned, and wherein the surface of the colored coating comprises an embossed profile.

10. The security document of claim 1, wherein the colored coating comprises a colored agent dispersed within a polymeric matrix.

11. The security document of claim 1, wherein the foil laminate has a thickness of about 5 µm to about 15 µm.

12. The security document of claim 1, wherein the foil sheet of the foil laminate includes at least one non-transparent metal material.

13. The security document of claim 1, wherein the foil sheet of the foil laminate comprises a foil of aluminum.

14. The security document of claim 1, wherein the foil sheet of the foil laminate has a thickness that is about 1 µm or less.

15. The security document of claim 1, wherein the lacquer layer is positioned between the foil sheet and the outer lacquer coating.

16. A method of forming a security document, the method comprising:
forming an outer lacquer coating over a foil laminate adhered to a colored coating of a base sheet such that the foil laminate is embedded between the colored coating and the outer lacquer coating,
wherein the foil laminate comprises an adhesive layer, a foil sheet, and a lacquer layer, and wherein the adhesive layer is positioned on the colored coating, and wherein the foil sheet is positioned between the adhesive layer and the lacquer layer.

17. The method of claim 16, further comprising: embossing the outer lacquer layer.

18. A method of forming a security document, the method comprising:
embedding a foil laminate between a base sheet and an outer lacquer coating,
wherein the foil laminate comprises an adhesive layer, a foil sheet, and a lacquer layer, and wherein the base sheet comprises a colored coating on which the foil laminate is adhered and the outer lacquer coating is applied over the foil laminate and the colored coating.

* * * * *